US008975201B2

(12) United States Patent
Davidovics

(10) Patent No.: US 8,975,201 B2
(45) Date of Patent: Mar. 10, 2015

(54) MATRIX BASED ON NANOCRYSTALLINE CRISTOBALITE FOR A THERMOSTRUCTURAL FIBROUS COMPOSITE MATERIAL

(75) Inventor: M. Michel Davidovics, Pont Sainte Maxence (FR)

(73) Assignee: Pyromeral Systems, S.A., Pont Sainte Maxence (FR)

( * ) Notice: Subject to any disclaimer, the term of this patent is extended or adjusted under 35 U.S.C. 154(b) by 23 days.

(21) Appl. No.: 13/640,365

(22) PCT Filed: Mar. 28, 2011

(86) PCT No.: PCT/FR2011/000185
§ 371 (c)(1),
(2), (4) Date: Oct. 10, 2012

(87) PCT Pub. No.: WO2011/128521
PCT Pub. Date: Oct. 20, 2011

(65) Prior Publication Data
US 2013/0130886 A1    May 23, 2013

(30) Foreign Application Priority Data
Apr. 14, 2010   (FR) ...................... 10 01582

(51) Int. Cl.
| | | |
|---|---|---|
| C04B 35/14 | (2006.01) | |
| C04B 35/00 | (2006.01) | |
| C03C 14/00 | (2006.01) | |
| C04B 28/00 | (2006.01) | |
| C04B 35/80 | (2006.01) | |
| C04B 41/00 | (2006.01) | |
| C04B 41/50 | (2006.01) | |
| C04B 41/68 | (2006.01) | |

(52) U.S. Cl.
CPC .............. *C03C 14/00* (2013.01); *C04B 28/006* (2013.01); *C04B 35/14* (2013.01); *C04B 35/803* (2013.01); *C04B 41/009* (2013.01); *C04B 41/5089* (2013.01); *C04B 41/68* (2013.01); *C04B 2235/3201* (2013.01); *C04B 2235/3217* (2013.01); *C04B 2235/3427* (2013.01); *C04B 2235/5244* (2013.01); *C04B 2235/528* (2013.01); *C04B 2235/9607* (2013.01)
USPC .......................................... 501/154; 501/133

(58) Field of Classification Search
CPC ........ C04B 35/14; C04B 35/16; C04B 33/13; C04B 33/131; C04B 20/0004
USPC .......... 428/426, 446, 448, 450, 688; 501/133, 501/154
See application file for complete search history.

(56) References Cited

U.S. PATENT DOCUMENTS

| | | | | |
|---|---|---|---|---|
| 6,300,862 | B1 * | 10/2001 | Ishida ......................... | 338/22 R |
| 6,472,972 | B1 * | 10/2002 | Ishida ......................... | 338/22 R |
| 6,482,387 | B1 * | 11/2002 | Gulgun et al. ............. | 423/593.1 |

FOREIGN PATENT DOCUMENTS

| | | |
|---|---|---|
| EP | 0463927 A1 | 1/1992 |
| EP | 0514611 A1 | 11/1992 |
| EP | 0819657 A1 | 1/1998 |
| EP | 0854116 A2 | 7/1998 |
| FR | 2659320 A1 | 9/1991 |
| WO | 8802741 A1 | 4/1988 |
| WO | 2005030662 A2 | 4/2005 |
| WO | 2007141455 A2 | 12/2007 |

OTHER PUBLICATIONS

F. Aumento et al.; Stability, Lattice Parameters, and Thermal Expansion of B-Cristobalite; The American Mineralogists, Dalhousie University, Halifax, N.S., Canada, vol. 81, pp. 1167-1176; Jul. 1966.

Anthony J. Perrotta et al.; Chemical Stabilization of B-Cristobalite; Journal of the American Ceramic Society;vol. 72, No. 3; pp. 441-447(Mar. 1989).

Waltraud M. Kriven et al.; Toughening of Mullite/Cordierite Laminated Composites by Transformation Weakening of B-Cristobalite Interphases; Department of Materials Science and Engineering, University of Illinois at Urbana-Champaign, Urbana, Illinois 61801; Journal of American Ceramic Society, vol. 88, No. 6, pp. 1521-1528 (2005); DOI: 10.1111/j.1551-2916.2005.00303.x.

Yoshihiko Imanaka et al.; Cristobalite Phase Formation in Glass/Ceramic Composites; Journal of the American Ceramic Society, vol. 78, No. 5, pp. 1265-1271; Fujitsu Laboratories Ltd., Atsugi, Kanagawa, 243-01, Japan (1995).

(Continued)

*Primary Examiner* — Noah Wiese

(74) *Attorney, Agent, or Firm* — Bachman & LaPointe, P.C.

(57) ABSTRACT

A matrix for a thermostructural fibrous composite material obtained by geopolymer synthesis based on nanocrystalline cristobalite resulting from the crystallization of geopolymer micelles of potassium polysiloxonate K—(Si—O—Si—O)$_n$. The nanocrystalline cristobalite is in the form of micelles and/or microspheres having dimensions of less than 1 micron, preferably of less than 500 nanometers, connected together by an amorphous phase. The matrix contains at least 85 percent by weight of oxide $SiO_2$ with at most 15%, preferably at most 10%, by weight of alkali metal oxide $K_2O$. The nanocrystalline cristobalite results from the crystallization of geopolymer micelles of potassium polysiloxonate by a heat treatment at a temperature preferably between 600° C. and 800° C., for a time of less than 30 minutes. The fibrous composite material impregnated with this matrix is thermostructural.

10 Claims, No Drawings

(56) References Cited

OTHER PUBLICATIONS

Michael A. Saltzberg et al.; Synthesis of Chemically Stabilized Cristobalite; Journal of the American Ceramic Society, vol. 75, No. 1; pp. 89-95; (1992); E.I. du Pont de Nemours and Company, Inc., Wilmington, Delaware 19880-0262.

Y. Zhu et al.; The preparation of nano-crystallized cristobalite under hydrothermal conditions; Journal of Materials Science, 40 (2005); pp. 3829-3831; Institute of Process Engineering, Chinese Academy of Sciences, Zhongguancun Beiertiao 1, Haidian, Beijing 100080.

Joseph Davidovits; Geopolymer, Green Chemistry and Sustainable Development Solutions, Proceedings of the World Congress Geopolymer 2005, Instiut Geopolymere (Geopolymer Institute) ISBN 2-9514820-0-0 (2005), pp. 11-12.

* cited by examiner

MATRIX BASED ON NANOCRYSTALLINE CRISTOBALITE FOR A THERMOSTRUCTURAL FIBROUS COMPOSITE MATERIAL

BACKGROUND

Field of the Invention

The invention relates to composite materials and to the processes for obtaining such materials, and more particularly to a thermostructural composite material comprising a fiber reinforcement and a matrix based on nanocrystalline cristobalite.

Thermostructural composites retain their mechanical properties (tensile strength, flexural strength, modulus of elasticity, etc.) at high temperature, for several hours, or even for several thousands of hours. They should not be confused with fire-resistant composites, which, even though they are nonflammable, such as certain geopolymer matrix composites, see their mechanical properties decline greatly from the first hours of use at temperatures above 400° C. Obviously, the thermostructural composite material according to the present invention is, by nature, also fire-resistant.

Normally, two types of thermostructural composite materials are distinguished, those containing a glass-ceramic matrix, also referred to as a glass-based matrix, and those containing an oxide-free CMC ceramic matrix. SiC, $Si_3N_4$ and C matrices are found in this second category. The material of the present invention is classed in the first category, that is to say that of the glass-ceramic matrix. But all this is just a simple convention. It certainly does not mean that this matrix is constituted of glass.

SUMMARY OF THE INVENTION

In the case of the present invention, the thermostructural composite material comprises a matrix essentially constituted of a mineral based on nanocrystalline cristobalite as defined by its X-ray diffraction spectrum. The main subject of the invention is the description of this matrix based on nanocrystalline cristobalite. A second subject is the description of the process for obtaining same, which includes a geopolymer synthesis of a binder of potassium polysiloxonate K—(Si—O—Si—O)$_n$ type, and a third subject relates to the description of the composite materials thus obtained.

PRIOR ART

Glass-ceramic matrix composite materials are valued in industry, especially in the aeronautical and aerospace industries and also in the automotive industry. These thermostructural materials make it possible to produce structures that have good thermomechanical properties. The production thereof is envisaged for applications requiring a good resistance in continuous use (of several hundreds, or even thousands of hours) at temperatures of the order of 300 to 1000° C.

However, most materials of this type developed to date are not completely satisfactory, both from the point of view of their final properties and the point of view of their method of production. Indeed, new applications demand fibrous composite materials with matrices that have the following characteristics:

a procedure corresponding to the following three criteria: a) manufacturing process that takes place at low and moderate temperatures; b) methods that respect the thermal properties of the reinforcing fibers; c) system that makes it possible to produce complex or large-sized parts;

good thermal shock resistances;

average thermal expansion coefficients slightly greater than those of the reinforcing fibers.

There is a mineral used in ceramics, endowed with these thermal characteristics, but the conventional manufacturing process of which involves very high temperatures. It is cristobalite, essentially constituted of crystalline silica $SiO_2$. It was therefore necessary to develop a matrix based on cristobalite having a manufacturing process that may easily be carried out at low temperature in order to produce thermostructural fibrous composites. Furthermore, this matrix must be the result of the curing of a binder in which the size of the minerals is less than 2 microns, preferably less than 1 micron, in order to ensure a perfect impregnation between the fibers. The matrix then contains a nanocrystalline cristobalite, the geopolymer micelles or particles of which have dimensions of less than 1 micron, preferably of less than 500 nanometers. This is the main subject of the present invention.

In the prior art, glass-ceramic matrix composite materials are generally denoted as being based on silica. This does not mean that the glass-ceramic matrix is essentially constituted of silica $SiO_2$, as is the case for special composites containing vitreous silica, in particular those used for manufacturing radomes that are transparent to radar waves. Quite the contrary, these silica-based matrices indicate that they contain silicon Si, in the form of lithium aluminosilicate (LAS), $LiO_2.Al_2O_3.SiO_2$, magnesium aluminosilicate (MAS), $MgO.Al_2O_3.SiO_2$, barium aluminosilicate (BAS), $BaO.Al_2O_3.SiO_2$, calcium aluminosilicate (CAS), $CaO.Al_2O_3.SiO_2$, as can be read in patent EP 0 819 657.

As shown in table 1, the amount of $SiO_2$ for these prior art materials varies between 19% and 31.2% by weight of the matrix and the designation glass-ceramic matrix based on silica is therefore inaccurate.

TABLE 1

| $SiO_2$ % by weight in the glass-ceramic matrices of the prior art | |
| --- | --- |
| (LAS), $LiO_2\cdot Al_2O_3\cdot SiO_2$ | 31.2% |
| (MAS), $MgO\cdot Al_2O_3\cdot SiO_2$ | 29.7% |
| (BAS), $BaO\cdot Al_2O_3\cdot SiO_2$ | 19.0% |
| (CAS), $CaO\cdot Al_2O_3\cdot SiO_2$ | 25.7% |

Obviously, it is possible to include in the manufacturing process an excess of silica, which will remain as filler in the matrix. Thus, in patent EP 0 404 632, a glass-ceramic matrix is claimed in which this amount of silica $SiO_2$ is between 25% and 70%, the glass-ceramic matrix being essentially constituted of aluminosilicate containing alkaline-earth metal oxides and rare-earth oxides.

On the contrary, in the present invention, the designation glass-ceramic matrix based on silica is correct since the amount of $SiO_2$ is greater than 85% by weight of the matrix. Indeed, the matrix according to the invention is based on nanocrystalline cristobalite essentially containing at least 85% by weight of silica. Furthermore, in all these cases from the prior art, the process for manufacturing the thermostructural composite material requires a densification at a temperature of at least 850° C., preferably between 900° C. and 1100° C., the whole thing under an isostatic pressure of at least 3 MPa, for several hours, followed by another heat treatment between 1100° C. and 1200° C., or even 1350° C.

More recently, patent application WO 2005/030662, describes a process for manufacturing a lithium aluminosilicate (LAS) glass-ceramic matrix in which the densification temperature takes place at a substantially lower temperature, around 500° C. For this use is made of the technique known as sol-gel impregnation.

On the contrary, in the present invention, the manufacturing process follows the technology developed for geopolymer matrices, that is to say with the aid of a densification (a polycondensation) carried out at a temperature below 200° C., under a vacuum cover in an autoclave. Use is made, within the context of the invention, of the geopolymer compound of potassium polysiloxonate K—(Si—O—Si—O)$_n$ type. When a short heat treatment at a temperature of 700° C. is applied to this geopolymer matrix, without exerting pressure, it crystallizes in the form of a mineral based on nanocrystalline cristobalite as defined by its X-ray diffraction spectrum with the three main lines at 2 theta values 21.9 (hkl 101), 31.4 (hkl 102), 36.4 (hkl 200), for CuKa1 radiation. The X-ray diffraction spectrum is however always accompanied by a line at 2 theta value 21 degrees which can be attributed to tridymite (hkl 100).

In the article by Y. Imanaka & al. "Cristobalite phase formation in glass-ceramic composite", J. Amer. Ceram. 1995, the objective is to avoid any crystallization of cristobalite. If not, the crystallization takes place at a temperature above 1000° C., with a treatment of at least 5 hours. European patent application EP 1 991 /0401 345 presents a composite material having a glass-ceramic matrix based on oxides of silica, alumina and lithium, i.e. the LAS already described above. In particular, it is read therein that the manufacturing process is carried out so that, here too, ". . . the appearance of damaging crystalline phases, such as cristobalite . . ." is avoided. Quite on the contrary, the process according to the present invention describes a heat treatment at a temperature above 500° C., preferably between 600° C. and 800° C., enabling the crystallization of a mineral based on nanocrystalline cristobalite.

A fluoroaluminosilicate geopolymer binder described in patent FR 2 659 320 is also known. This binder may be, inter alia, used for impregnating fiber reinforcements. It comprises a geopolymer of fluoro-alkali metal poly(sialate-siloxo) (M,F)-PSDS type accompanied by an alkali metal aluminofluoride, cryolite $Na_3AlF_6$ or elpasolite $K_2NaAlF_6$, and by a silicaeous phase of Opal CT type, that is to say of hydrated silica type. The amount of this silicaeous phase may vary between 10 and 95 parts by weight of the geopolymer binder. As can be read in the description on page 6, lines 11 to 19, the silicaeous phase originates from the precipitation of the alkali metal silicate present in the reaction mixture, with the sodium fluorosilicate $Na_2SiF_6$. It is also read therein that the characteristic of this silicaeous phase is that it is amorphous to X-rays. On the other hand, it is observed that this silicaeous phase of Opal CT type confers quite particular dilatometric properties at temperature. It is read, for example, on lines 22-23 of page 4 that it is not crystalline cristobalite, although this Opal CT silicaeous phase has a dilatometric curve characteristic of $SiO_2$ in cristobalite phase. In fact, it is also taught in lines 7 to 15 of page 7, "[ . . . ] In what follows the cristobalite character is defined by the very characteristic discontinuity of the expansion-shrinkage curve, in shrinkage phase at 200° C. The concentration of $SiO_2$ of Opal CT type can be followed, on the one hand, by the intensity of the cristobalite discontinuity and, on the other hand, by the value of the linear thermal expansion coefficient $\Delta\lambda$. $10^{-6}/°$ C. [ . . . ]".

A person skilled in the art knows that crystalline cristobalite possesses this dilatometric behavior, namely a large expansion from 0 to 210° C., of the order of $15\times10^{-6}/°$ C. then, after the discontinuity at 200-210° C., a small expansion of the order of 2 to $5\times10^{-6}/°$ C. It is the first dilatometric phase, that of large expansion, which is claimed in patent FR 2 659 320.This expansion is essentially a function of the amount of silica $SiO_2$ of Opal CT type. Thus, for 10 to 25 parts of Opal CT, the coefficient is less than $10\times10^{-6}/°$ C. For 26 to 75 parts of Opal CT it is between $10\times10^{-6}$ and $20\times10^{-6}/°$ C. and for 76 to 95 parts of Opal CT, it is greater than $20\times10^{-6}/°$ C.

In comparison, within the context of the present invention, the matrix is formed from a mineral based on nanocrystalline cristobalite as defined by its X-ray diffraction spectrum. It is not made of Opal CT hydrated silica that is completely amorphous to X-rays, but on the contrary its diffraction spectrum is extremely precise and clearly characterizes a crystalline cristobalite. Within the context of the invention it is even nanocrystalline, that is to say constituted of nanocrystals having dimensions of less than 1 micron, preferably of less than 500 nanometers.

It is also know that the composite having a fiber reinforcement produced using the geopolymer matrix of (F,M)-PSDS type of patent FR 2 659 320 does not correspond to the definition given above for the thermostructural composite material. Obviously, like all geopolymer matrices, it is fire-resistant, but its use is limited to moderate temperatures, in general below 500° C. As can be learnt in the work entitled "*Geopolymer Chemistry & Applications*" by Joseph Davidovits, (2008), published by the Institut Géopolymère (Geopolymer Institute), ISBN 978-2-9514-8201-2, depending on the nature of the fiber that forms the reinforcement, the flexural strength drops abruptly above 400° C. with the carbon fiber, or above 600° C. with the SiC fiber (see chapter 21, FIGS. 21.11 and 21.12). This abrupt drop in strength is essentially due to the softening of the geopolymer matrix accompanied by a large expansion, since it contains a very large amount of fluxing agent: cryolite and elpasolite.

On the contrary, the thermostructural composite material comprising a fiber reinforcement and a matrix based on nanocrystalline cristobalite according to the present invention contains neither cryolite nor elpasolite. As can be observed, its X-ray diffraction spectrum describes only cristobalite with its main crystallographic planes at 2 theta values 21.9 (hkl 101), 31.4 (hkl 102), 36.4 (hkl 200), for CuKa1 radiation. It may be used continuously, at temperatures above 500° C., up to 1000° C., without undergoing significant degradation or loss of mechanical strength over the entire duration of its exploitation. Usage temperatures are essentially determined by the nature of the reinforcing fibers containing at least one of the elements Si, B, O, N and C. A person skilled in the art knows that in the case of the carbon fiber, the degradation thereof is avoided by working in a non-oxidizing atmosphere.

In the prior art it is known how to synthesize crystalline cristobalite from amorphous silica. For example, diatomaceous earth consists of hydrated amorphous silica that is industrially heat-treated at a temperature above 900° C., usually above 1000° C. A calcined diatom product is obtained, which is used in the production of filters for the food industry and which contains between 40% and 60% by weight of crystalline cristobalite, the size of which is in general greater than 2 microns. It can be read in patent EPO463927: "The calcination of diatomites with a view to producing filtering agents therefore also has the purpose of agglomerating the diatoms and their debris having a length of a few micrometers into aggregates of 10 μm or more, in order to decrease the fines content thereof, and to increase the permeability thereof.

It is obviously a partial agglomeration, which it is advisable to control so as to avoid the complete fusion of the diatomite skeletons and the formation of aggregates having a size of greater than 50 μm, which have the grave drawback of settling or depositing in the low points of the pipes or filters during filtration operations."

Using this cristobalite diatom for manufacturing a thermostructural composite material comprising a fiber reinforcement and a matrix based on nanocrystalline cristobalite, by impregnating the fibrous reinforcement with a mineral binder (for example a geopolymer binder) containing a cristobalite of very small size, could be considered. For this, it would be necessary to mill it very finely, at least to less than 2 microns, preferably to less than 1 micron, or use a manufacturing process that would avoid any agglomeration of the siliceous skeletons having dimensions of less than 2 microns. Patent WO 88/02741 indicates that in the case of a geopolymer-type ceramic matrix composite material, the size of the fillers must be less than 2 microns. However, it is very difficult and very costly to achieve a particle size of this type by simple milling, and therefore, to the applicant's knowledge, the subject of the invention cannot be achieved by this method.

Described in European patent application EP 1996/0903002 is the manufacture of a silica glass containing cristobalite particles having a size between 0.1 micron and 1000 microns. However, in the examples given in this patent for illustrating this silica glass, the size of the cristobalite particles is never less than 40 microns. There is no process for producing a nanocrystalline cristobalite having a size of less than a micron, and the widening to the range of 0.1 micron appears only to be a stylistic phrase (it is not moreover repeated in the claims). However, here too, the final product is a solid silica glass that it will be necessary to mill to a dimension of less than 2 microns as in the case of the calcined diatom mentioned previously. Furthermore, the method of manufacturing the cristobalite passes through a melting stage, that is to say involves temperatures between 1630° C. and 1720° C. This is not the case for the present invention in which the mineral based on nanocrystalline cristobalite is crystallized at a much lower temperature, above 500° C., preferably between 600 and 800° C.

In the article by M. A. Saltzberg & al., "Synthesis of Chemically Stabilized Cristobalite", J. Amer. Ceram. Soc, 75 (1), 89-95 (1992), cristobalite is produced by starting from an amorphous silica gel, added to which are dopant products: Al, Na, Sr, K, Ca. Here too, the temperature for conversion to cristobalite is at least 1000° C., for 24 hours. In the Si:Al:Ca system, it is 8 hours at 1100° C. In the Si:Al:K system at least 24 hours at 1100° C. are needed. The Si:Al:K system is the one preferred in the examples of the present invention which, unlike the prior art, produces nanocrystalline cristobalite at a temperature much lower than 1100° C., between 500° C. and 800° C. only. Furthermore, the crystallization time is very short since at 700° C. it is only 10 to 15 minutes.

Proposed in an article by F. Aumento, "Stability, Lattice Parameters, and Thermal Expansion of β-Cristobalite", The American Mineralogists, Vol. 81, 1167-1176, July 1966, is the manufacture of cristobalite from the thermal degradation of a zeolite, stilbite, calcium aluminosilicate. The crystallization to cristobalite is only carried out at a temperature above 920° C., in fact above 965° C., and even closer to 1000° C., over 24 hours. In the method of the present invention, this crystallization of the cristobalite takes place much lower, at around 700° C., for a time of less than 30 minutes, in general between 10 and 15 minutes.

In an article by W. Kriven and S. J. Lee, "Toughening of Mullite/Cordierite Laminated Composites by Transformation Weakening of β-Cristobalite Interphases", J. Am. Ceram. Soc., 86 [6], 1521-1528, (2005), the behavior of a mullite/cordierite composite containing a cristobalite interface was studied. It is taught therein that the crystallization is carried out at 1300° C. and the size of the cristobalite particles is around 4 microns.

In an article by A. J. Perrotta & al., "Chemical Stabilisation of β-Cristobalite", J. Amer. Ceram., 72 [3], 441-47, (1989), it is described how to produce cristobalite by thermal crystallization of synthetic zeolites and gels, therefore from sodium and calcium aluminosilicate, the chemistry of which is close to that of geopolymers. The manufacture of the cristobalite is essentially a function of the Si:Al atomic ratio of the aluminosilicate. Thus, in table IV, for Si:Al=25 ($SiO_2$:$Al_2O_3$=50), the crystallization temperature is 1200° C.; with a ratio Si:Al=7 ($SiO_2$:$Al_2O_3$=14), the crystallization temperature is 850° C. (it is therefore different from that given in FIG. 3, example C which, for the same aluminosilicate, indicates 800° C., which could be a simple material error since it does not fit with the logic of the mixtures described in table IV). However, the aluminosilicate matrix requires extremely long crystallization times, of at least 24 hours and it contains less than 80% by weight of silica oxide $SiO_2$. The mineral used in example 5 of the present invention has a ratio Si:Al=30, which implies a temperature of 1250° C. according to the method described in this article by A. J. Perrotta & al. However, the applicant has discovered to its great surprise that it was possible to manufacture a glass-ceramic matrix by favoring the formation of nanocrystalline cristobalite with the aid of a very rapid crystallization, of the order of 10 to 15 minutes at 700° C. The matrix is present in the form of micelles and/or microspheres having dimensions of less than 1 micron, preferably of less than 500 nanometers. Said micelles and/or microspheres are connected together by a cellular amorphous phase consisting of closed cells.

The scientific article by Zhu et al. states the rules to be followed in order to obtain a nanocrystalline cristobalite (see Y. Zhu, K. Yanagisawa, A. Onda and K. Kajiyoshi, "The preparation of nano-crystallized cristobalite under hydrothermal conditions", Journal of Materials Science, 40, 3829-3831 (2005). The starting raw material is a colloidal silica, a silica gel, the size of the micelles (of the particles) of which is of the order of 18-20 nanometers. The crystallization to nanocrystalline cristobalite is carried out at moderate temperatures between 200° C. and 400° C., but it is solely a function of the nature of the alkali metal salts and alkaline solutions used durng the experiment. It is discovered therein that the cristobalite only forms with the alkali metal salts NaF and KF (with a preference for NaF), but that, on the other hand, the action of NaOH always results in the formation of quartz. However, the presence of the alkali metal salts NaF and KF prevents this nanocrystalline cristobalite from forming a matrix that has thermostructural properties. Specifically, these alkali metal salts act as fluxing agents which, at higher temperatures, will convert the matrix to glass. One is then under the same practical conditions which are unfavorable at high temperature as those encountered for the geopolymer binders of (M,F)-PSDS type, mentioned above in patent FR 2 659 320.

In this scientific article by Zhu et al., the use of NaOH gives rise to the formation of quartz, instead of cristobalite. Indeed, in an example presented subsequently, and under the conditions of the process according to the invention, the X-ray diffraction diagram of the matrix thus obtained does not contain crystalline cristobalite. In the article by Zhu et al., it is also discovered that a person skilled in the art knows in a highly alkaline medium, quartz is always formed, not cristobalite. It could be deduced therefrom that the same would be true with another alkali metal hydroxide, potassium hydroxide KOH. However, to the very great surprise of the applicant, the process according to the invention is characterized in that the matrix based on nanocrystalline cristobalite results from the crystallization of a geopolymer micelle of potassium polysiloxonate K—(Si—O—Si—O)$_n$, by the action of potassium hydroxide KOH, which appears contrary to the prodigious teaching by the prior art. Furthermore, contrary to what is taught by the article by Zhu et al., the geopolymer synthesis of the matrix is carried out at a temperature below 200° C., followed by a heat treatment at a temperature above 500° C., preferably between 600° C. and 800° C. However, according to Zhu et al., above 400° C., quartz is always formed.

In the present invention, the matrix based on nanocrystalline cristobalite is in the form of micelles and/or microspheres having dimensions of less than 1 micron, preferably of less than 500 nanometers. This matrix based on nanocrystalline cristobalite of the present invention enables the manufacture of a thermostructural composite material comprising a fiber reinforcement. It contains, besides oxygen and carbon, the following main elements: Si, K, Al, Zr, among which at least 75 percent by atomic weight of Si. These main elements are those which, in the elemental analysis of the matrix using an electron microscope, are present at more than 0.2% by atomic weight. By way of indication, the chemical composition of said matrix contains at least 85% by weight of oxide $SiO_2$, at most 3% by weight of $Al_2O_3$, at most 10% by weight of $K_2O$, at most 4% by weight of $ZrO_2$. The absence of glass formers or modifiers as is claimed in application WO 2007/141455 is noted. The fiber reinforcement of the thermostructural composite material contains at least one of the elements Si, B, O, N and C. In addition, the amount of matrix based on nanocrystalline cristobalite is between 40 and 70 percent, preferably between 45 and 55 percent of the total weight of said composite material.

Geopolymer matrices of K-nano-poly(siloxo) or K-nano-poly(sialate) type are already known in the prior art. They are described in the book *Geopolymer, Green Chemistry and Sustainable Development Solutions, Proceedings of the World Congress Geopolymer* 2005, edited by Joseph Davidovits, Institut Géopolymère (Geopolymer Institute) ISBN 2-9514820-0-0 (2005), pages 11-12, and also in the book already mentioned above, *Geopolymer Chemistry & Applications,* in chapter 11, section 11.6, entitled *Poly(siloxo)* and *poly(sialate) cross-links, nanocomposite geopolymer.* In these prior art publications, the nanocomposite geopolymer is defined in that it comprises two phases:

1. a nodular phase of silica fume composed of nanospheres having a diameter of less than 1 micron, preferably of less than 500 nanometers.

2. a polymer phase, which is completely amorphous under observation using an optical microscope, consisting of linear poly(silanol) chains that are more or less crosslinked by a siloxo (—Si—O—Si—O—) bridge, or a sialate (Si—O—Al—O—) bridge.

The X-ray spectrum of this nano-poly(silanol) geopolymer matrix is completely amorphous. Then, still in the book *Geopolymer Chemistry & Applications,* the evolution of this matrix as a function of temperature, with formation of siloxo bridges, at 200° C. and at 500° C., is monitored. The X-ray spectra of this nano-poly(siloxo) matrix at 250° C. and at 500° C. are identical, and completely amorphous. But the conversion of the silanol groups to a siloxo bridge is expressed by the production of water originating from the dehydroxylation. The result thereof is an expansion of the geopolymer which is quite large since, at 250° C. the volume thereof is tripled (300% expansion) and at 850° C. a degree of expansion of 488% is achieved. The fact that the composite materials containing this matrix do not have the thermostructural character but that their mechanical strength decreases greatly as a function of the temperature is thus explained. Quite on the contrary, the composite material according to the present invention has little or no expansion, and it exhibits the thermostructural character, with mechanical strengths that are constant over several hours, or even several thousands of hours, in the temperature range between 200° C. and 1000° C.

In the prior art, this expansion is made to disappear by introducing sialate (Si—O—Al—O—) bonds or bridges. A three-dimensional crosslinking is thus obtained, denoted by the term nano-poly(sialate-siloxo). It is also described in the prior art (Proceedings of Geopolymer 2005) and also in chapter 11 of the book "*Geopolymer Chemistry & Applications*". The drawback of this poly(sialate-siloxo) matrix is that, during the increase in temperature, shrinkages and a very marked embrittlement of the composite material are observed. It is this failing that the process described in application WO 2007/141455 attempted to solve. In this patent, the embrittlement is prevented by incorporating glass formers into the matrix manufacturing process. Then, via a heat treatment, and under the effect of the glass formers, this poly(sialate-siloxo) matrix will be melted. This means that, once melted, it will be necessary to cool the material in order to solidify it. It is read, for example, in the description of WO 2007/141455, on lines 15-17, page 23: "The melting point of the matrix preferably lies between 600 and 1200° C., and depends on the nature of the glass to be formed . . . ", then in claim 35 "Part formed of a composite material having a fibrous reinforcement and a mainly glass matrix, . . . ". A person skilled in the art knows that a glass obtained by melting, which is then solidified, is amorphous to X-rays. The material described in this patent WO 2007/141455 is therefore an X-ray amorphous glass.

In the present invention, a crystallization of a mineral of nanocrystalline cristobalite type, without passing through the melting stage, is witnessed. The process for manufacturing the glass-ceramic matrix of nanocrystalline cristobalite type firstly comprises the synthesis, according to the processes already described above, of a compound based on geopolymer micelles of nano-poly(siloxo) type. This compound will be written here in its more precise form of potassium polysiloxonate, K—(Si—O—Si—O)$_n$. It contains at least 85% by weight of amorphous silica $SiO_2$ with at most 15%, preferably at most 10% by weight of a potassium oxide $K_2O$. As is observed, even after treatment at 500° C., there is no crystallization of nanocrystalline cristobalite, the X-ray diffraction spectrum being amorphous. Then a very short heat treatment (of around 10 minutes) is carried out in order to obtain the mineral based on nanocrystalline cristobalite. This results from the crystallization of geopolymer micelles of potassium polysiloxonate via a heat treatment at a temperature above 500° C., preferably between 600° C. and 800° C., for a time of less than 30 minutes.

Still with reference to application WO 2007/141455, we have seen above that claim 35 specified that in the part formed the matrix was a glass, and the characteristic of this glass is expanded upon in lines 20-28 on page 25: "In this formed part . . . the matrix has at least one of the following characteristics: —it has a $^{29}$Si NMR spectrum having the following three reference regions: −87±5 ppm, −98±5 ppm, −107±5 ppm . . . ". The resonance at −87 ppm characterizes the Si atom of $Q_2$ type, which is essentially found in glasses, that at −98 ppm corresponds to the $Si(Q_3)$ type, also present in glasses, and at the surface of the nodular phase. Finally, the resonance at −107 ppm, of $Si(Q_4)$ type, characterizes quartz or the inside of the SiO$_2$ nodule of amorphous structure. In the matrix according to the present invention, the $^{29}$Si NMR spectrum is different since it is essentially that of cristobalite, consisting of SiO$_2$ of Si(Q$_4$) type, with a single major resonance at −109 ppm (see, in the book: *High Resolution Solid-State NMR of Silicates and Zeolites,* by G. Engelhardt and D. Michel, John Willey & Sons, 1987, page 170 Silica polymorphs).

DETAILED DESCRIPTION OF THE PREFERRED EMBODIMENT(S)

The matrix according to the invention is characterized in that it contains a mineral based on nanocrystalline cristobalite which results from the crystallization of geopolymer micelles of potassium polysiloxonate. The latter are obtained by geopolymer synthesis at a temperature below 200° C. Next, the matrix is subjected to a heat treatment at a temperature above 500° C., preferably between 600° C. and 800° C. The nanocrystalline cristobalite is in the form of micelles and/or microspheres having dimensions of less than 1 micron, preferably of less than 500 nanometers, connected together by an amorphous phase. This amorphous phase may also be slightly cellular, consisting mainly of closed cells. The assembly forms the matrix based on nanocrystalline cristobalite as defined by its X-ray diffraction spectrum with the three main lines at 2 theta values 21.9 (hkl 101), 31.4 (hkl 102), 36.4 (hkl 200), for CuKa1 radiation. The X-ray diffraction spectrum is also accompanied by a line at 2 theta value 21 degrees which can be attributed to tridymite (hkl 100).

The matrices based on nanocrystalline cristobalite according to the present invention are generally used in the manufacture of composites containing fibrous reinforcements that are intended for use at high temperature, of the order of 300° C. to 1000° C., continuously, over hundreds or thousands of hours. The usage temperatures are essentially determined by the nature of the reinforcing fibers containing at least one of the elements Si, B, O, N and C. A person skilled in the art knows that in the case of the carbon fiber, the degradation thereof is avoided by working in a non-oxidizing atmsophere. In addition, the amount of matrix based on nanocrystalline cristobalite is between 40 and 70 percent, preferably between 45 and 55 percent of the total weight of said composite material. Its linear expansion coefficient is $\Delta\lambda > 10\times10^{-6}/°$ C. from 0° C. to 210° C. then $\Delta\lambda < 6\times10^{-6}/°$ C. above 210° C.

These matrices can also be used in the manufacture of objects having a ceramic nature containing well-referenced mineral fillers. In the case of the fiber-reinforced composite, firstly the fiber is impregnated with a geopolymer binder of potassium polysiloxonate K—(Si—O—Si—O)$_n$ type, then the geopolymer synthesis is carried out in the autoclave at around 200° C. Finally, the composite material thus produced is subjected to a heat treatment at a temperature above 500° C., preferably between 600° C. and 800° C., for a relatively short time of between 10 minutes and 30 minutes. After the heat treatment, the composite material contains the thermostructural matrix essentially consisting of a mineral based on nanocrystalline cristobalite as defined by its X-ray diffraction spectrum, namely the three main lines at 2 theta values 21.9 (hkl 101), 31.4 (hkl 102), 36.4 (hkl 200), for CuKa1 radiation.

The starting raw material is amorphous silica consisting of amorphous particles having dimensions of less than 1 micron, preferably of less than 500 nanometers. Several types are distinguished:
colloidal silica,
silica gel,
silica fume.

They are described in chapter 11 of "*Geopolymer Chemistry & Applications*" already cited above, and also their products obtained by geopolymer synthesis. These silicas produce X-ray diffraction diagrams which are completely amorphous. It therefore appears difficult to know their molecular structure.

However, by virtue of Nuclear Magnetic Resonance, it is known that the molecular structure of these various amorphous silicas consists of regions having the hkl 100 and hkl 111 faces of β-cristobalite; see D. W. Sindorf and G. E. Maciel, "$^{29}$Si NMR Study of Dehydrated/Rehydrated Silica Gel Using Cross Polarization and Magic-Angle Spinning", J. Am. Chem. Soc., Vol. 105, No 6 1487-1493 (1983). It was therefore necessary to find a method which makes it possible to crystallize this cristobalite structure already present in the disorganized state in amorphous and colloidal silicas, without leading to the crystallization of quartz. In addition, it was necessary for this method to produce a matrix free of fluxing agent and glass former, in order to ensure the thermostructural properties of the fibrous composite material obtained by this method.

The matrix based on nanocrystalline cristobalite for a thermostructural fibrous composite material of the present invention is illustrated by the following examples. They in no way limit the overall scope of the invention as presented in the claims.

EXAMPLE 1

The geopolymer synthesis of the nano-poly(siloxo) described in chapter 11 of "*Geopolymer Chemistry & Applications*">>, section 11.6, page 264-266 is carried out. For this, silica fume, originating from the electrofusion, at 2000° C., of a natural silicate, is reacted with potassium silicate. Thus, 245 g of geopolymer mixture are prepared, containing:
H$_2$O: 3.5 mol,
K$_2$O: 0.276 mol,
SiO$_2$: 2.509 mol.
SiO$_2$ originates from the silica fume and potassium silicate of molar ratio SiO$_2$:K$_2$O=1.25. K$_2$O originates from the potassium silicate. The ratio between the oxides is:
SiO$_2$:H$_2$O=0.72,
SiO$_2$:K$_2$O=9.1.

After polycondensation at 80° C. for 2 hours, the evolution of the nano-poly(siloxo) geopolymer as a function of temperature, up to 500° C., is monitored. For this, the temperature of the furnace increases by 10° C. per minute and a hold is established at 500° C. for 30 minutes, before leaving to cool. It is confirmed that, at 500° C., the X-ray diffraction diagram is amorphous. There is no crystallization of quartz as should have been the case according to the article by Zhu et al. described above. There is also absence of cristobalite. However, accidentally, the heat treatment was continued up to 750° C., with a hold at 750° C. for 15 minutes. The X-ray diffraction diagram then exhibits the very characteristic lines of cristobalite with the three main lines at 2 theta values 21.9 (hkl 101), 31.4 (hkl 102), 36.4 (hkl 200), for CuKa1 radiation. The molecular structure formed of cristobalite hkl 100 and hkl 111 faces of the (amorphous) silica fume is therefore revealed at this temperature of 750° C., after a time of less than 30 minutes.

Is this a simple physical conversion of silica fume nanospheres at this temperature or else does this crystallization to cristobalite result from the action of the alkaline part of the potassium silicate? To find out, a sample of silica fume is brought to a temperature of 750° C., under the same conditions as before, namely an increase of 10° C. per minute and a hold at 750° C. for 15 minutes. The X-ray diffraction diagram remains completely amorphous, there is no formation of nanocrystalline cristobalite. In the case of the nano-poly(siloxo) of this example 1, the formation of nanocrystalline cristobalite would probably be the result of the "dopant" action of $K_2O$.

But we know that this geopolymer has a serious drawback which makes it absolutely unable to fulfill the role of matrix for a thermostructural composite material, as claimed by the present invention. Still referring to the book "*Geopolymer Chemistry & Applications*", it is learnt that between 20° C. and 850° C. this geopolymer undergoes an expansion of close to 500% by volume. It is not temperature-stable. The poly (sialate-siloxo) crosslinks do not meet this criterion either, since they induce shrinkages, and, in addition, according to the prior art, the presence of free alumina in the geopolymer medium prevents the formation of cristobalite.

EXAMPLE 2

The geopolymer synthesis of a potassium polysiloxonate K—(Si—O—Si—O)$_n$ is carried out by reacting silica fume originating from the electrofusion, at 2000° C., of a natural silicate with potassium hydroxide KOH. Thus, 674 g of geopolymer mixture are prepared, containing:
$H_2O$: 7.22 mol,
$K_2O$: 0.5 mol,
$SiO_2$: 7.08 mol.
$SiO_2$ originates from the silica fume, $K_2O$ and $H_2O$ originate from an aqueous solution of KOH. The ratio between the oxides is:
$SiO_2:H_2O=0.98$,
$SiO_2:K_2O=14.16$.

After polycondensation at 80° C. for 2 hours, the evolution of the potassium polysiloxonate geopolymer as a function of temperature, up to 750° C., is monitored as in example 1. It is confirmed that, at 500° C., the X-ray diagram is amorphous. But, after the heat treatment at 750° C. for 15 minutes, the X-ray diffraction diagram then exhibits the very characteristic lines of cristobalite with the three main lines at 2 theta values 21.9 (hkl 101), 31.4 (hkl 102), 36.4 (hkl 200), for CuKa1 radiation. In addition, the geopolymer has only undergone a very slight expansion of less than 3% by volume.

EXAMPLE 3

The geopolymer synthesis according to example 2 is restarted, but by replacing the potassium hydroxide with sodium hydroxide NaOH. After the heat treatment at 750° C., the X-ray diffraction diagram remains amorphous. The nanocrystalline cristobalite phase is not developed.

EXAMPLE 4

The geopolymer synthesis according to example 2 is restarted, but by replacing the silica fume with colloidal silica of Ludox or equivalent type. After polycondensation at 80° C. for 2 hours, the evolution of the potassium polysiloxonate geopolymer as a function of temperature, up to 750° C., is monitored as in example 1. It is confirmed that, at 500° C., the X-ray diagram is amorphous. But, after the heat treatment at 750° C. for 15 minutes, the X-ray diffraction diagram then exhibits the very characteristic lines of cristobalite with the three main lines at 2 theta values 21.9 (hkl 101), 31.4 (hkl 102), 36.4 (hkl 200), for CuKa1 radiation. In addition, the geopolymer has only undergone a very slight expansion of less than 3% by volume.

EXAMPLE 5

A geopolymer mixture according to example 2 is produced that has to serve as a matrix having a thermostable composite material. For this, various ingredients known in the prior art for facilitating the impregnation and modifying the rheology of binders originating from geopolymer synthesis and conventional alkali metal silicates are added to the geopolymer mixture. Mention will be made, for example, of the wetting agents and surface tension modifiers that can be used in a strongly alkaline medium; also other organic products such as polyols and polyglycols (soluble in an alkaline medium), generally used as adjuvant products in very small amounts, in general of less than 2% by weight of the matrix.

After maturing for 1 hour, a fabric of silicon carbide (SiC) fibers, orientation 0/90 is impregnated at 200 g/m$^2$. It is made sure that the ratio between the weight of the geopolymer mixture and the weight of fibers is 55/45. Thus a formable composite material is produced containing 10 layers of impregnated fabric, and then it is placed on a metal sheet, the assembly being covered with a vacuum cover. A vacuum is maintained for 1 hour at ambient temperature, and then the complex is placed in an autoclave at 120° C. under 6 bar of pressure for 3 hours. After cooling, the sheets are withdrawn and they are subjected to a heat treatment at 750° C. for 15 minutes. For this, the sample is placed in the furnace at 20° C. and the temperature is increased, at a rate of 10° per minute, then when 750° C. is attained, a hold is maintained for 15 minutes. Next it is left to cool in the furnace.

After cooling, examination of the X-ray diffraction spectrum of the matrix shows the three main lines at 2 theta values 21.9 (hkl 101), 31.4 (hkl 102), 36.4 (hkl 200), for CuKa1 radiation. The X-ray diffraction spectrum is also accompanied by a line at 2 theta value 21 degrees attributed to tridymite (hkl 100).

In the composite material, the ratio of weight of matrix based on nanocrystalline cristobalite to weight of SiC fibers is 49/51.

A sample of this composite material is subjected to various analyses, namely:

a) an elemental chemical analysis of the matrix, by electron microscopy, in % by weight of the matrix:
$SiO_2=86.6\%$,
$Al_2O_3=2.5\%$,
$K_2O=8.94\%$,
$ZrO_2=1.8\%$.
The molar ratios are:
$SiO_2:K_2O=15.15$,
$SiO_2:Al_2O_3=60$, i.e. an atomic ratio Si:Al=30.
The zirconium oxide, to the knowledge of the applicant, does not react in the geopolymer synthesis. It remains an integral part of the geopolymer micelle.

b) thermal expansion coefficient:
in the fiber direction, $\Delta\lambda=4.5\times10^{-6}$,
in the thickness:
from 20° C. to 210° C., $\Delta\lambda=13.5\times10^{-6}$,
from 210° C. to 900° C., $\Delta\lambda=5.5\times10^{-6}$.

The composite material thus produced has a flexural strength of 158 MPa at 20° C.; this remains at 142 MPa after 100 hours at 700° C. and is still at 124 MPa after 1000 hours at 700° C.

EXAMPLE 6

A composite material according to example 5 is produced, but the source of $SiO_2$ consists of silica fume (see example 2) and colloidal silica (see example 4) in a 50/50 ratio by weight of $SiO_2$. The matrix based on nanocrystalline cristobalite is obtained and the ratio of weight of matrix to weight of SiC fiber is 48/52.

A sample of this composite material is subjected to elemental chemical analysis of the matrix, by electron microscopy, in % by weight of the matrix:

$SiO_2$=88.75%,
$Al_2O_3$=1.25%,
$K_2O$=8.94%,
$ZrO_2$=0.9%.

The molar ratios are:
$SiO_2$:$K_2O$=15.5,
$SiO_2$:$Al_2O_3$=123, i.e. an atomic ratio Si:Al=61.5.

A person skilled in the art will be able to add to the the geopolymer synthesis any mineral or organic auxiliary agent known for increasing the amount of air included in the matrix, or for facilitating the production of the composite material. Various modifications may therefore be made by a person skilled in the art to the process for preparing the matrix based on nanocrystalline cristobalite that has just been described solely by way of example, without departing from the scope of the invention.

The invention claimed is:

1. A process for manufacturing a matrix for a thermostructural fibrous composite material, consisting of a mineral containing nanocrystalline cristobalite, wherein said process comprises the following steps:
the geopolymer synthesis of potassium polysiloxonate K—(Si—O—Si—O)$_n$, consisting in a densification carried at a temperature below 200° C.; followed by a heat treatment at a temperature above 500° C. for enabling the crystallization of the lineral bases on nanocrystalline cristobalite.

2. A matrix for a thermostructural fibrous composite material obtainable by the process of claim 1.

3. The matrix of claim 2, wherein the matrix has a linear expansion coefficient which is $\Delta\lambda>10\times10^{-6}$/° C. from 0° C. to 210° C., then $\Delta\lambda<6\times10^{-6}$/° C. above 210° C.

4. The matrix of claim 2, wherein said matrix contains, besides oxygen and carbon, the following main elements: Si, K, Al, Zr, among which at least 75 percent by atomic weight of Si.

5. The matrix of claim 2, wherein the matrix contains at least 85 percent by weight of oxide $SiO_2$.

6. The matrix of claim 2, wherein the mineral is in the form of at least one of micelles and microspheres of nanocrystalline cristobalite having dimensions of less than 1 micron connected together by a cellular geopolymer amorphous phase.

7. The matrix of claim 6, wherein the at least one of micelles and microspheres of nanocrystalline cristobalite have dimensions of less than 500 nanometers.

8. A thermostructural fibrous composite material, comprising the matrix as defined in claim 2 and reinforcing fibers.

9. The thermostructural fibrous composite material of claim 8, wherein the amount of the matrix is between 40 and 70 percent of the total weight of said composite material.

10. The thermostructural fibrous composite material of claim 9, wherein the amount of the matrix is between 45 and 55 percent of the total weight of said composite material.

* * * * *